No. 639,579. Patented Dec. 19, 1899.
J. JONES.
PROCESS OF RECOVERING ZINC FROM REFRACTORY ZINC BEARING ORES.
(Application filed Mar. 17, 1898.)
(No Model.)
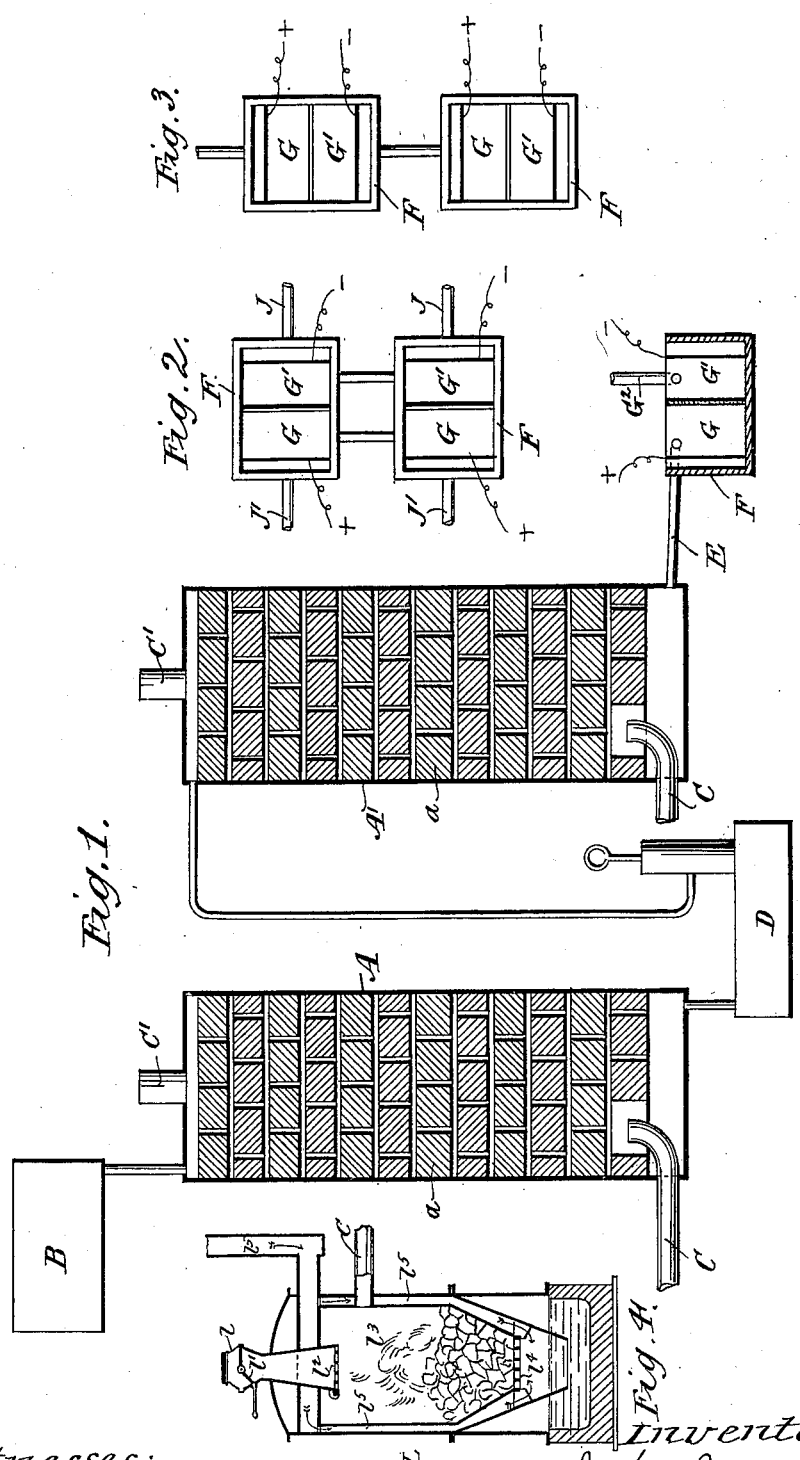

UNITED STATES PATENT OFFICE.

JOHN JONES, OF EAST MELBOURNE, VICTORIA.

PROCESS OF RECOVERING ZINC FROM REFRACTORY ZINC-BEARING ORES.

SPECIFICATION forming part of Letters Patent No. 639,579, dated December 19, 1899.

Application filed March 17, 1898. Serial No. 674,239. (No specimens.)

*To all whom it may concern:*

Be it known that I, JOHN JONES, a subject of the Queen of Great Britain, and a resident of No. 18 Brunswick street, East Melbourne, in the Colony of Victoria, have invented a certain new and useful Improved Process for the Recovery of Zinc from Refractory Zinc-Bearing Ores, of which the following is a specification.

The object of this invention is to provide an economic and efficient process whereby zinc is recovered from its ores. I first obtain a mixed solution of sulfate of zinc and sulfate of ammonia, and this I subject to electrolysis for the deposition of the zinc, the essential feature in the electrolytic treatment being that the catholyte solution is kept in a slightly-acid state and is not allowed either to become too acid or to become alkaline, so that a continuous desposit of zinc is obtained which is not redissolved by the solution.

The accompanying drawings will serve to illustrate my process; but I do not confine myself to the use of this particular apparatus, as the same may be varied without departing from my invention.

Figure 1 is a sectional view of the apparatus, and Figs. 2 and 3 are plan views of the anode and cathode compartments. Fig. 4 is a sectional view.

The zinc-bearing ore is first roasted to sulfate, sulfite, or oxid. The zinc is then leached out of the roasted ore by water (as sulfate) or by an acid solution. The solution of zinc thus obtained is next to be freed from its iron and other impurities. This may be accomplished by any well-known means; but I prefer to employ an absorbing-tower A of ordinary construction, into which the solution is fed from vessel B and in which the solution is subjected to producer-gases containing ammonia, which enters the tower by pipe C, whereby iron and some other impurities are precipitated. The solution will percolate through the perforated blocks $a$, being in this case subjected to the gas in the tower for a limited time only, so as not to allow of the precipitation of the zinc. The blocks $a$ are preferably composed of fire-brick, but may also be composed of slate, stone, or material of that nature which will not be affected by the solution of the gases. Any manganese will remain in solution with the zinc, and provision is made, as hereinafter, for its removal. After purification the solution has added to it sulfate of ammonia in sufficient quantity to supply the ammonium ions to the catholyte of the electrolytic cell, as hereinafter described, and the mixed solution of sulfate of zinc and sulfate of ammonia is then to be treated by electrolysis.

I prefer to obtain the mixed solution of sulfate of zinc and sulfate of ammonia in the following manner: The purified solution of sulfate of zinc passes from tower A into vessel D, wherein it has free acid added to it, preferably ten to twenty-five per cent. It is then led or pumped into an absorbing-tower A', similar to that employed for purifying the zinc solution, in which it is subjected to gases as before. These gases come from a producer such as that shown at Fig. 4, (described fully in *Minutes of Proceedings of Civil Engineers*, London, 1896,) wherein coal is fed in at the hopper $l$, having damper $l'$, and lodges on hinged grating $l^2$, where it is subjected to heat prior to entering the main chamber $l^3$, where it lodges on the fire-bars $l^4$ above the water-sealed bottom of said chamber. Air is fed to the fuel through passages $l^5$, and the producer-gases generated pass out by pipe C. The gases are generated in an apparatus in which water-gas or producer-gas, or both, are made, such gas being made so that very little tar will be carried with the gases, while the ammonia will not be destroyed. The free acid in the zinc-sulfate solution will thus be caused to combine with the ammonia contained in the gases, so as to form sulfate of ammonia, while the mixed solution of sulfate of ammonia and sulfate of zinc will be conducted from said tower to the electrolytic cell or battery F by pipe E. The gases from the producer (thus freed from ammonia) may be conducted from the tower by pipe C' and employed as fuel for the engines operating the dynamos or be conducted to the furnace employed in roasting the ore or used for other like purposes. The mixture of sulfate of zinc and sulfate of ammonia is allowed to flow into the electrolytic vats, each cell of which is divided into two compartments by means of a porous septum, composed of canvas or porous porcelain or such like material and which should be of such porosity as to allow sufficient free acid from anolyte side to pass, so as to neutralize catholyte easily, but not sufficiently porous to allow the electrolysis to proceed too rapidly; otherwise the solutions would mix. On the other hand, if a septum of too close material be employed the catholyte solution would become alkaline and require the addition of acid. On one side of this septum an anode of metal or other conductor, preferably lead, is used and on the other side a cathode of metal or other conductor, preferably zinc, is placed. The mixture of sulfate of zinc and sulfate of ammonia is allowed to flow into the anode-compartment G, while either acid zinc sulfate or acid zinc sulfate and sulfate of ammonia flows into the cathode-compartment G', the added sulfate of ammonia being for the purpose of producing ammonium ions in the catholyte and also hardening the zinc coat as it is deposited. The action will therefore be as follows: On the electric current being applied to the anode and cathode zinc is deposited on the cathode and ammonium liberated in catholyte, the ammonium combining with the free acid of the catholyte, forming sulfate of ammonia, and thereby the free acid is kept from accumulating around or near the cathode surface and the re-solution of the deposited zinc is prevented. $SO_4$ is liberated at the anode, which combining with the $H_2$ of the water forms sulfuric acid. The zinc being thus deposited and the catholyte solution becoming less acid by the passage of $SO_4$ ions to the anode and ammonium ions to the cathode the catholyte would in time become alkaline, so that fresh acid must be supplied to the catholyte either by the inflowing acid zinc sulfate, or by adding fresh acid, or, as represented in Fig. 3, allowing some of the contents of the anode-chamber to flow into the cathode-chamber, thus making and maintaining the solution sufficiently acid for the continued deposition of the zinc.

In lieu of the solution flowing from anolyte to catholyte it might be arranged to flow, as represented in Fig. 2, to the next anode-compartment, or from catholyte to the next cathode-compartment of a series and fresh acid solution added to the catholyte by pipes J as required to maintain it at a low degree of acidity, while sulfate of ammonia is added by pipes J' to the anolyte solution in sufficient quantity to maintain the passage of the ammonium ions to the catholyte, so that practically the whole of the zinc will be deposited, while a solution of sulfate of ammonia will be formed in the cathode-compartment.

Any maganese that may not have been previously eradicated is partly precipitated at the anode by a little fine carbon or hydrocarbon, which is added to the anolyte solution for the purpose of reducing the permanganates or permanganic acid formed, and thereby precipitating them as lower oxid.

At the end of the process there will be a solution of sulfate of ammonia containing some sulfate of zinc in the cathode-chamber, and a solution of sulfuric acid containing a little sulfate of zinc in the anode-chamber, together with a little iron, maganese, or other impurities which might not have been previously completely extracted. The sulfuric acid can be used again for leaching the ore and the sulfate-of-ammonia solution can be used again in the electrolytic cells or otherwise.

In lieu of the employment of sulfates in the herein-described process I may employ chlorids.

Having now particularly described and ascertained the nature of my said invention and in what manner the same is to be performed, I declare that what I claim is—

The herein-described process which consists in placing in the anode-compartment of a cell having a suitable diaphragm, a mixture of sulfate of zinc and sulfate of ammonium, placing in the cathode-compartment an acid solution containing sulfate of zinc, passing an electric current through both solutions, whereby zinc and ammonium are set free at the cathode, and continuously adding to the cathode solution sufficient acid solution containing zinc sulfate to neutralize the ammonium liberated in said solution and to maintain in the solution a low degree of acidity, substantially as described.

Signed at Melbourne, in the Colony of Victoria, this 15th day of January, 1898.

JOHN JONES.

Witnesses:
C. W. WADE,
A. HARKER.